(12) United States Patent
Togashi (10) Patent No.: US 7,221,417 B2
(45) Date of Patent: May 22, 2007

(54) LIQUID CRYSTAL DISPLAY DEVICE AND METHOD FOR MANUFACTURING THE SAME

(75) Inventor: Seigo Togashi, Sakado (JP)

(73) Assignee: Citizen Watch Co., Ltd., Tokyo (JP)

( * ) Notice: Subject to any disclaimer, the term of this patent is extended or adjusted under 35 U.S.C. 154(b) by 249 days.

(21) Appl. No.: 10/740,864

(22) Filed: Dec. 22, 2003

(65) Prior Publication Data

US 2004/0207783 A1    Oct. 21, 2004

(30) Foreign Application Priority Data

Dec. 26, 2002   (JP)   .............................. 2002-377005

(51) Int. Cl.
G02F 1/1335   (2006.01)
(52) U.S. Cl. ...................... 349/106; 349/113
(58) Field of Classification Search ................ 349/106, 349/113, 114
See application file for complete search history.

(56) References Cited

U.S. PATENT DOCUMENTS

| | | | |
|---|---|---|---|
| 4,610,509 A * | 9/1986 | Sorimachi et al. | 349/106 |
| 6,657,687 B2 | 12/2003 | Takizawa | |
| 6,690,438 B2 * | 2/2004 | Sekiguchi | 349/114 |
| 6,750,932 B2 * | 6/2004 | Kim | 349/114 |
| 6,842,209 B2 * | 1/2005 | Sumiyoshi et al. | 349/115 |

FOREIGN PATENT DOCUMENTS

| | | |
|---|---|---|
| JP | 7-128517 | 5/1995 |
| JP | 10-282488 | 10/1998 |
| JP | 2000-98346 | 4/2000 |
| JP | 2000-298271 | 10/2000 |
| JP | 2001-33778 | 2/2001 |
| JP | 2001-133762 | 5/2001 |

* cited by examiner

Primary Examiner—David Nelms
Assistant Examiner—David Y. Chung
(74) Attorney, Agent, or Firm—Finnegan, Henderson, Farabow, Garrett and Dunner, L.L.P.

(57) ABSTRACT

A liquid crystal display device comprises: first and second transparent substrates; a liquid crystal that is enclosed between the first and second transparent substrates; a first color filter that is formed on either the first or second transparent substrate; a light reflective layer that has a plurality of openings and that is formed on the second transparent substrate toward the liquid crystal; and a second color filter that is formed on the second transparent substrate on the side opposite to the liquid crystal. The second color filter is fabricated by forming a layer of a color photosensitive material such as a photosensitive emulsion and illuminating and coloring this layer by light transmitting through the first color filter using the reflective layer as an exposure mask. As a result, a second color filter, that has a color dot pattern the same as that of the first color filter, is formed by one exposure and developing process.

11 Claims, 6 Drawing Sheets

LIQUID CRYSTAL DISPLAY DEVICE AND METHOD FOR MANUFACTURING THE SAME

CROSS-REFERENCE TO RELATED APPLICATION

This application claims the priority of Japanese Patent Application No. 2002-377005, filed on Dec. 26, 2002.

BACKGROUND OF THE INVENTION

1. Field of the Invention

The present invention relates to a transflective liquid crystal display device that can be used in both transmissive and reflective modes and a method for manufacturing the same.

2. Prior Art

Transflective liquid crystal display devices, which operate in a reflective mode utilizing ambient light in bright places and operate in a transmissive mode utilizing backlight in dark places, are broadly used, in particular, as display devices in portable electronic equipment. For example, Japanese Unexamined Patent Publication No. H10-282488 entitled "Liquid crystal display device" proposes a liquid crystal display device in which holes for transmitting light are provided on a reflective layer of a reflective liquid crystal display device and, at the same time, a backlight device is provided behind the reflective layer. When this device is used in the reflective mode, an image is displayed by the ambient light reflected by the reflective layer disposed behind a liquid crystal layer and, when this device is used in the transmissive mode, the image is displayed by guiding the light from the backlight device to the liquid crystal cell through the holes provided on the reflective layer.

However, the device disclosed in Japanese Unexamined Patent Publication No. H10-282488 has a problem in that, in a color display mode, color reproducibility is not optimized in both the reflective mode and the transmissive mode. The reason of this problem is as follows. When the device is used in the reflective mode, the ambient light passes through the liquid crystal layer and a color filter and is reflected by the reflective layer disposed on the backside of the color filter and, then, passes through the color filter and the liquid crystal cell again and, then, exits from the cell and is observed by a user. Therefore, as the incident light passes through the color filter twice before exiting from the cell, the transmittance of the light and, thus, the brightness of the display is reduced by the color filter. As the light passes through the color filter twice, the color saturation of the light is increased. In contrast to this, when the device is used in the transmissive mode, as the light that is originated from the backlight device disposed behind the cell passes through the holes disposed on the reflective layer and, then, passes through the color filter and liquid crystal cell and exits from the cell, the light passes through the color filter only once. Therefore, the brightness of the display is not reduced but the color saturation is reduced. As described above, as the color reproducibility is not optimized in both the transmissive mode and the reflective mode, there is a problem in that, if the optical density of the color filter is optimized for either the transmitting mode or the reflective mode, the display in the other mode is not optimized.

In order to solve the above problem of the liquid crystal display device shown in Japanese Unexamined Patent Publication No. H10-282488, other liquid crystal display devices have been proposed in Japanese Unexamined Patent Publication No. 2000-298271 entitled "Liquid crystal display element and method for manufacturing the same", Japanese Unexamined Patent Publication No. 2001-33778 entitled "Liquid crystal display device and method for manufacturing the same and electronic equipment" and the like. As these liquid display devices are configured so that the thickness of the color filter differs between the region above a reflective layer and the region above openings of the reflective layer, the same color reproducibility can be obtained in both the transmissive and reflective modes. For example, by making the thickness of the color filter above the openings of the reflective layer twice as large as that of the color filter above the reflective layer, the thickness the light passes through in the color filter is same in both the transmissive and reflective modes and, as a result, the same color reproducibility of the display can be obtained in both modes.

However, in the devices described above, in order to provide the color filter with different thickness between the region above the reflective layer and the region above the openings, the reflective layer must be thicker having a two-layer construction comprised of a resin layer and a reflective layer and, further, two layers of the color filter must be formed. In the case of a three-color filter, in order to form the two layers of the color filter, an exposure and developing process must be repeated six times and, therefore, the manufacturing process becomes complicated and the production cost of the liquid crystal display device itself is increased.

SUMMARY OF THE INVENTION

In view of the above problems, it is an object of the present invention to provide a transflective liquid crystal display device of a novel construction that does not require a complicated manufacturing process and that can obtain an appropriate color reproducibility of a display in both a reflective mode and a transmissive mode, and a method for manufacturing the transflective liquid crystal display device.

In order to achieve the above object, according to the present invention, there is provided a liquid crystal display device, comprising: first and second transparent substrates; a liquid crystal that is enclosed between said first and second transparent substrates; a first color filter that is formed on either said first or second transparent substrate; a light reflective layer that has a plurality of openings and that is formed on said second transparent substrate toward the liquid crystal; and a second color filter that is formed on said second transparent substrate on the side opposite to said liquid crystal.

When said device is used in the reflective mode, an incident light that comes on this device from above the first transparent substrate passes through the first color filter and is reflected by the reflective layer, passes the first color filter again and exits from this device and is observed by a user. Therefore, the incident light passes the first color filter twice. On the other hand, when this device is used in the transmissive mode, light that is originated from a backlight device disposed on the backside of the second transparent substrate passes through the second color filter and further passes through the openings of the reflected plate and the first color filter and, then, exits from this device and is observed by the user. Therefore, as the light from the backlight passes through the second and first color filters, if the first and second color filters have the substantially same optical density, an appropriate color reproducibility of the display can be obtained in both the reflective and transmissive modes.

The liquid crystal display device of the present invention described above is manufactured by a method comprising the steps of: forming a reflective layer having a plurality of openings and then a first color filter on a second transparent substrate sequentially; applying a color photosensitive material on a surface of said second transparent substrate on the side opposite to that on which said reflective layer is formed; forming a second color filter that has a color dot matrix pattern the same as that of said first color filter by illuminating said color photosensitive material from above said first color filter through the openings of said reflective layer; disposing a first transparent substrate opposed to the surface of said second transparent substrate on which said first color filter is formed; and filling a liquid crystal between said first and second transparent substrates.

According to the manufacturing method described above, the second color filter mentioned above is formed by exposing and coloring the color photosensitive material on the surface of said second transparent substrate on the side opposite to said liquid crystal by the light transmitting through said first color filter and by using said reflective layer as an exposure mask. Therefore, in contrast to the prior art wherein the same number of coloring processes as the number of colors is needed, the coloring process must be performed only one time for the second filter and, therefore, the manufacturing process is simplified significantly and the production cost of the device is reduced.

Further, the liquid crystal display device of the present invention described above is manufactured by a method comprising the steps of: forming a reflective layer having a plurality of openings and then a first color filter on a second transparent substrate sequentially; disposing a first transparent substrate through a sealing member opposite to and above a surface of said second transparent substrate on which said reflective layer and first color filter are formed; applying a color photosensitive material on a surface of said second transparent substrate on the side opposite to that on which said first color filter is formed; forming a second color filter by illuminating said color photosensitive material from above said first transparent substrate through said first color filter, said openings being provided on said reflective layer and said second transparent substrate and coloring the material; and filling a liquid crystal between said first and second transparent substrates.

According to the manufacturing method described above, as the process for forming the second color filter is performed after the liquid crystal cell is constituted by the first and second transparent substrates, there is an effect in that, when the second color filter is formed, the contamination of the surfaces of the liquid crystal cell and the damage of the substrates due to handling of the substrates can be prevented and, therefore, the liquid crystal cell can be handled easily.

Still further, the liquid crystal display device described above is manufactured by a method comprising the steps of: forming a reflective layer having a plurality of openings and then a first color filter on a second transparent substrate sequentially; disposing a first transparent substrate through a sealing member opposite to and above a surface of said second transparent substrate on which said reflective layer and first color filter are formed; filling a liquid crystal between said first and second transparent substrates; applying a color photosensitive material on a surface of said second transparent substrate on the side opposite to said liquid crystal; and forming a second color filter by illuminating said color photosensitive material from above said first transparent substrate through said liquid crystal, said first color filter, said openings provided on said reflective layer and said second transparent substrate, and coloring the material.

According to the manufacturing method described above, after the liquid crystal cell is constituted by the first and second transparent cell and the liquid crystal is filled into the cell, the process for forming the second color filter is performed using the photosensitive emulsion. As a result, dust or other contaminants can be prevented from being mixed into the liquid crystal at the time of exposure and developing of the photosensitive emulsion and, therefore, a liquid crystal display device having high reliability can be obtained.

In this connection, said first color filter is formed by either a photolithography, printing, electrodeposition or inkjet method. Further, said color photosensitive material is a photosensitive emulsion and the step of forming said second color filter comprises the step of developing said photosensitive emulsion that has been exposed. This photosensitive emulsion is, for example, a silver chloride emulsion. As the silver chloride emulsion is sensitive to ultraviolet (UV) light, it is preferable that the polarizer has a UV screening function.

Further, the color filters may have three colors of red, green and blue or three colors of cyan, magenta and yellow. Further, it may have other combinations of colors. The reflective layer can be formed by a film of aluminum or silver or alloys including these metals and is provided with openings at positions corresponding to regions of each color of the color filters.

DESCRIPTION OF THE PREFERRED EMBODIMENTS

Hereinafter, preferred embodiments of the present invention will be described with reference to the drawings.

Figure 1:
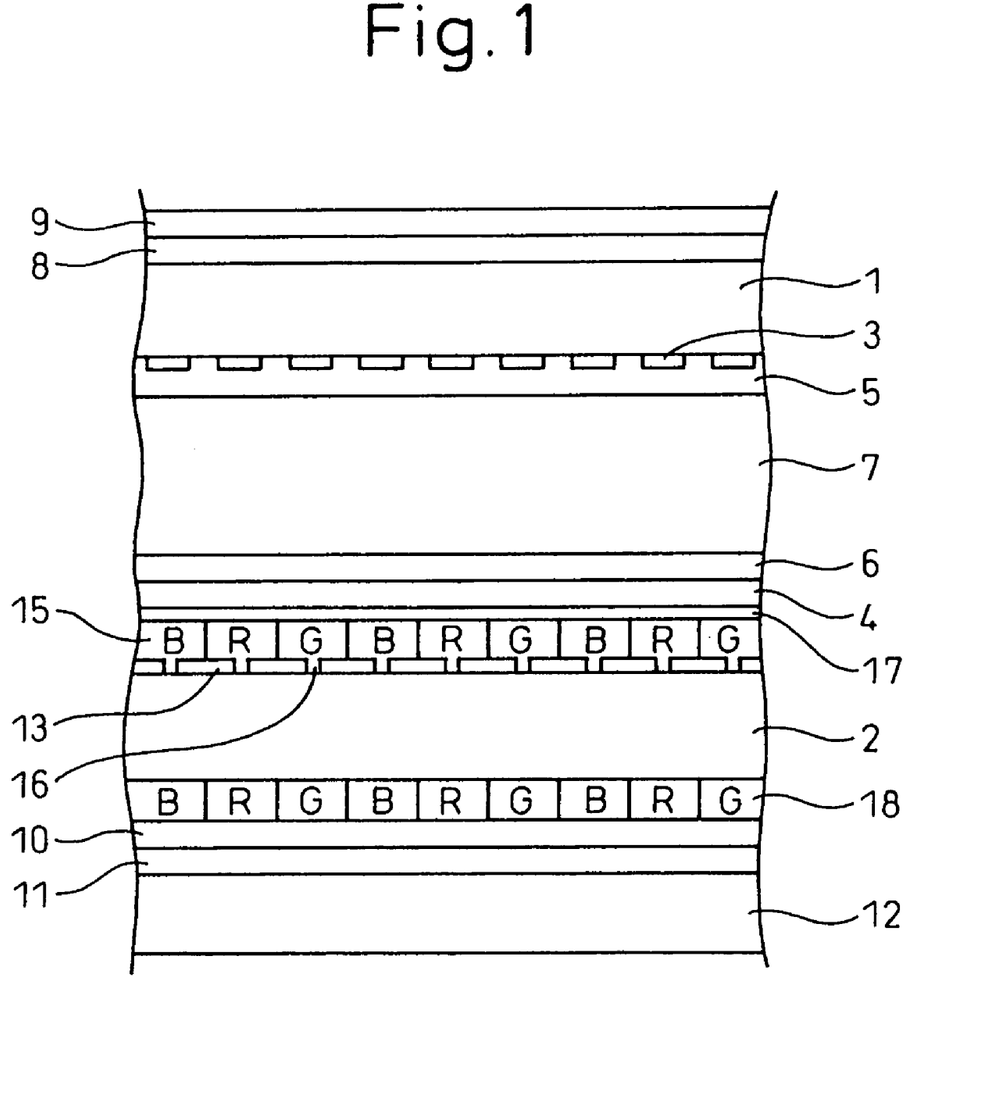
FIG. 1 schematically shows a cross section of a liquid crystal display device according to a first embodiment of the present invention.

FIG. 1 is a schematic cross-sectional view of a transflective liquid crystal display device according to a first embodiment of the present invention. The shown embodiment is an STN liquid crystal display device, wherein transparent substrates 1 and 2, such as glass sheets, constitute a top substrate and a bottom substrate of a liquid crystal cell, respectively. Then, signal electrodes 3 are formed on a surface of the top substrate 1 facing a liquid crystal layer and a common electrode 4 is formed on a bottom substrate 2. Typically, these are comprised of transparent electrodes. In this connection, a reflective layer and a first color filter described below are disposed between the bottom substrate 2 and the common electrode 4. Then, alignment layers 5 and 6 and a liquid crystal layer 7 are shown. The top substrate 1 is provided with a retardation film 8 and a polarizer 9 on the side opposite to the liquid crystal layer 7 and the bottom substrate 2 is also provided with a retardation film 10 and a polarizer 11 similarly. Then, a backlight device 12 is shown. The bottom substrate 2 is provided with the reflective layer 13 that is a deposited film of aluminum or the like and the first color filter 15 on the side toward the liquid crystal layer 7. The color filter 15 is constituted by a plurality of repetitions of three color dots of R, G, B. The reflective layer 13 has openings (holes) 16 at positions corresponding to central positions of each dot of the color filter 15. Further, a planarizing layer 17 is formed on the first color filter 15 for planarizing a top surface of the color filter 15.

In this device, the bottom substrate 2 is further provided with a second color filter 18 on the side facing the backlight device. This second color filter 18 is formed when a photosensitive emulsion layer applied on the bottom substrate 2 is exposed and developed by light applied from the direction of the first color filter 15 by using the reflective layer 13, through which the openings 16 are formed, as a mask, as described later.

When the first color filter 15 described above is formed, the optical density of the color filter is optimized solely with respect to the color filter 15 so as to obtain proper color reproducibility when displaying in a reflective mode. The optical density of the second color filter 18 is optimized to be substantially similar to that of the first color filter 15. As a consequence, the transmittance of the light passing through the second color filter 18 and the first color filter 15 is equal to that of the light that is reflected by the first color filter 18 and returns toward the user and, therefore, an appropriate color reproducibility can be obtained in both transmissive and reflective modes.

Here, the openings 16 are not necessarily formed at the central positions of the respective dots (each of which corresponds to one pixel of the liquid crystal display device) on the reflective layer 13 and the openings 16 may be offset from the central positions. Further, each dot does not necessarily correspond to one opening and a plurality of openings may be formed in each dot. The ratio of the total area of the opening(s) in one dot to the area other than the opening(s), or the opening/dot (pixel) ratio is often about 30–60%.

Further, an insulating layer may be provided in at least one of the regions between the top substrate 1 and the alignment layer 5 and between the bottom substrate 2 and the alignment layer 6 to prevent short circuits between the transparent electrodes on the top substrate 1 and the transparent electrode on the bottom substrate 2 due to dust. The configuration of the retardation films 8 and 10, the polarizer 9 and 11 and the material of the liquid crystal layer 7 may be those that are typically used for STN liquid crystal display devices, for example, the specific description of which is omitted here.

FIGS. 2(a)–2(f) are diagrams showing a process for forming the first and second color filters 15 and 18, described above, on the bottom substrate 2 according to a method of the present invention. First, on a top surface of the bottom substrate 2 shown in FIG. 2(a), the reflective layer 13 is formed as shown in FIG. 2(b). Next, as shown in FIG. 2(c), a plurality of openings 16 are formed on the reflective layer 13. The openings 16 are disposed at positions corresponding to respective regions of each color of the second color filter to be formed later. Then, as shown in FIG. 2(d), the first color filter 15 is formed on the reflective layer 13. Though the color filter 15 may be formed by any manufacturing process, an example will be shown in FIG. 3.

The example of a method for manufacturing the first color filter 15 will be described with reference to FIGS. 3(a)–3(f). Here, in FIGS. 3(a)–3(f), for simplicity of description, the reference numeral 2' indicates the bottom substrate in the step shown in FIG. 2(d) and, therefore, the reflective layer 13 is formed on the substrate 2', though not shown, and the openings 16 are formed on the reflective layer 13. First, on the substrate 2' shown in FIG. 3(a), a layer 150 of a color filter raw material, which will be developed and patterned later, is formed as shown in FIG. 3(b). This layer 150 contains a pigment or a dye having a color such as red. Next, as shown in FIG. 3(c), the layer 150 is covered by an exposure mask 152 and, then, is exposed to light so that it is colorized and patterned. Then, the exposure mask 152 is removed as shown in FIG. 3(d) and, then, unnecessary portions of the layer 150 are removed by developing or other processes so as to form one color portion (for example, a red portion) as shown in FIG. 3(e). Then, a portion of another color of the color filter is formed by forming a base layer containing a pigment or a dye of the another color on the bottom substrate 2' and performing the exposure and developing in a manner similar to the above process. By repeating this process further once again, a color filter 15, on which a plurality of dots of red (R), green (G) and blue (B) colors are formed, is formed as shown in FIG. 3(f).

FIG. 2(d) shows the first color filter 15 formed on the bottom substrate 2 as described above. Here, as exemplary structural values of the color filter 15 and the reflective layer 13, for example, the size of the pixel is 180 μm×60 μm and the diameter of each opening 16 is about 40 μm. The thickness of the first color filter 15 is about 0.8 μm. The reflective layer 13 is formed of aluminum by the sputtering method and its thickness is about 0.15 μm, but the thickness may be increased to about 0.8 μm by forming the reflective layer of other materials or disposing a resin film under the reflective layer. Further, as discussed above, the ratio of the total area A of the opening(s) in one dot to the area B other than the opening(s), or the opening (A)/dot (pixel) (A+B) ratio is often in the range of 30–60%.

Next, a process for forming the second color filter 18 will be described. As shown in FIG. 2(e), a photosensitive emulsion layer 18, is formed by turning the bottom substrate 2 upside down and applying a silver-halide emulsion to its upper surface by a spinner, a squeegee or a printing method. Then, as shown in FIG. 2(f), the silver-halide emulsion layer 18' is exposed by using a white light source, wherein the light from the white light source is transmitted through the first color filter 15 and passes through the openings 16 of the reflective layer 13 to impinge on the photosensitive emulsion layer 18' and expose it. Then, by developing the photosensitive emulsion layer, the regions corresponding to the openings 16 are colored according to the color pattern of the first color filter so that the photosensitive emulsion layer acts as the second color filter. Here, light sources other than a white light source may be used for the exposure. For example, separate light sources may be provided for each of red, green, blue colors and lit simultaneously or a three wavelength light source tube may be used.

As described above, by using the reflective layer 13 as the light shielding mask (exposure mask) and exposing the photosensitive emulsion layer 18' to the light passing through the first color filter 15, the second color filter 18 having a three-color pattern is formed by one exposure and developing process. Therefore, the manufacturing process of the second color filter 18 is simplified significantly in comparison with that of the first color filter. In this connection, some portions of the photosensitive emulsion 18' below the reflective layer 13 existing between the adjacent openings 16 may not be exposed and developed but, even if there are such portions that are not exposed adequately, the appearance and display quality of the liquid crystal display device is not degraded because such portions are covered by the reflective layer 13 from the viewpoint of the user.

After the bottom substrate 2 having the two layers of the color filters shown in FIG. 2(f) has been formed as described above, the planarizing layer 17 is formed on the color filter 15 and, then, the common electrode and the alignment layer 6 are formed in a typical manner. The bottom substrate 2 in this state is opposed to the top substrate 1, on which the signal electrodes and the alignment layer are formed separately, so that each electrode forms the respective pixels and, further, the both substrates are coupled together through a frame-like sealing member to constitute the liquid crystal cell. Next, after a liquid crystal is filled into the cell and the retardation films, the polarizers and the backlight device are provided appropriately, the liquid crystal display device of the construction shown in FIG. 1 can be obtained.

Figure 2:
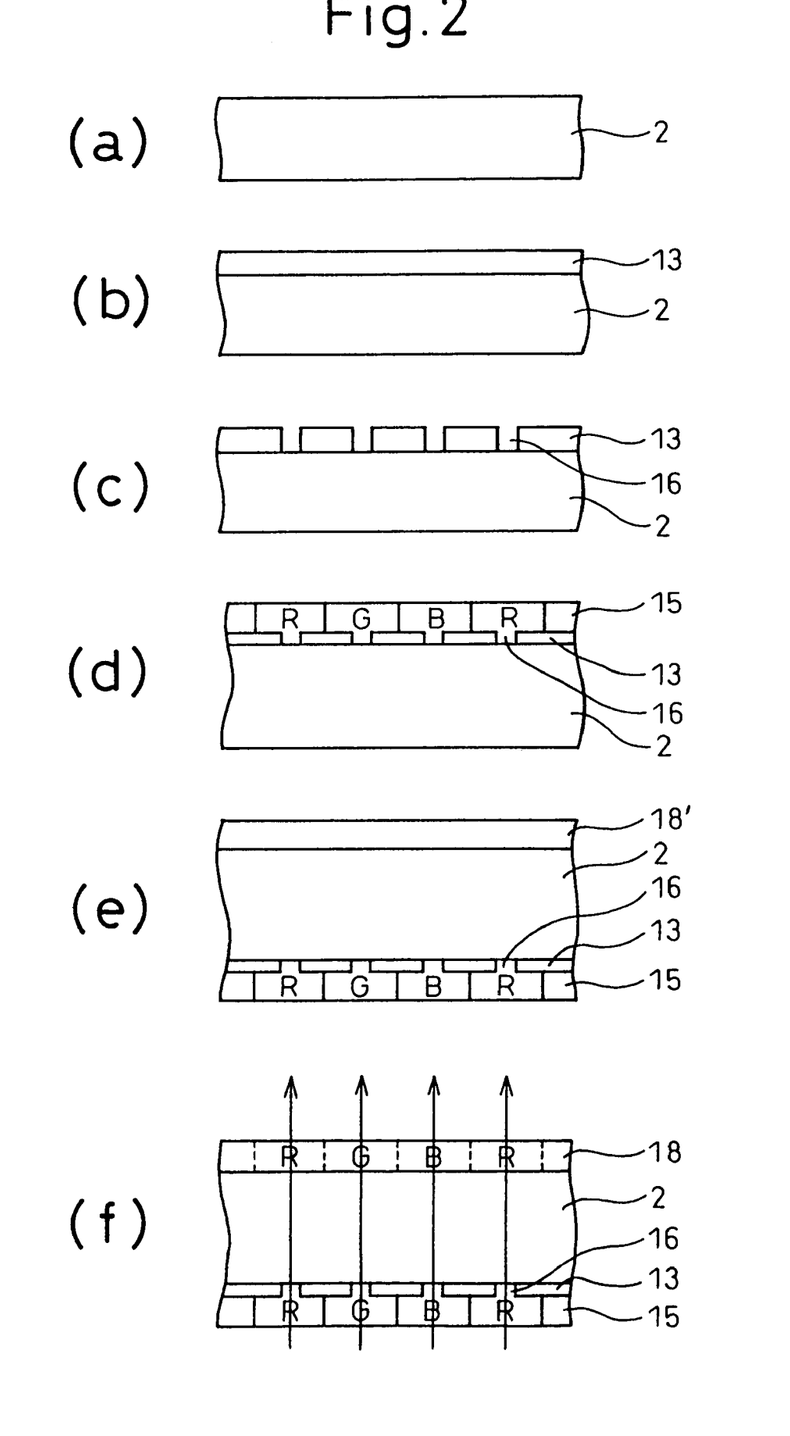
FIGS. 2(a)–2(f) show steps of a manufacturing process of the device shown in FIG. 1.
Figure 3:
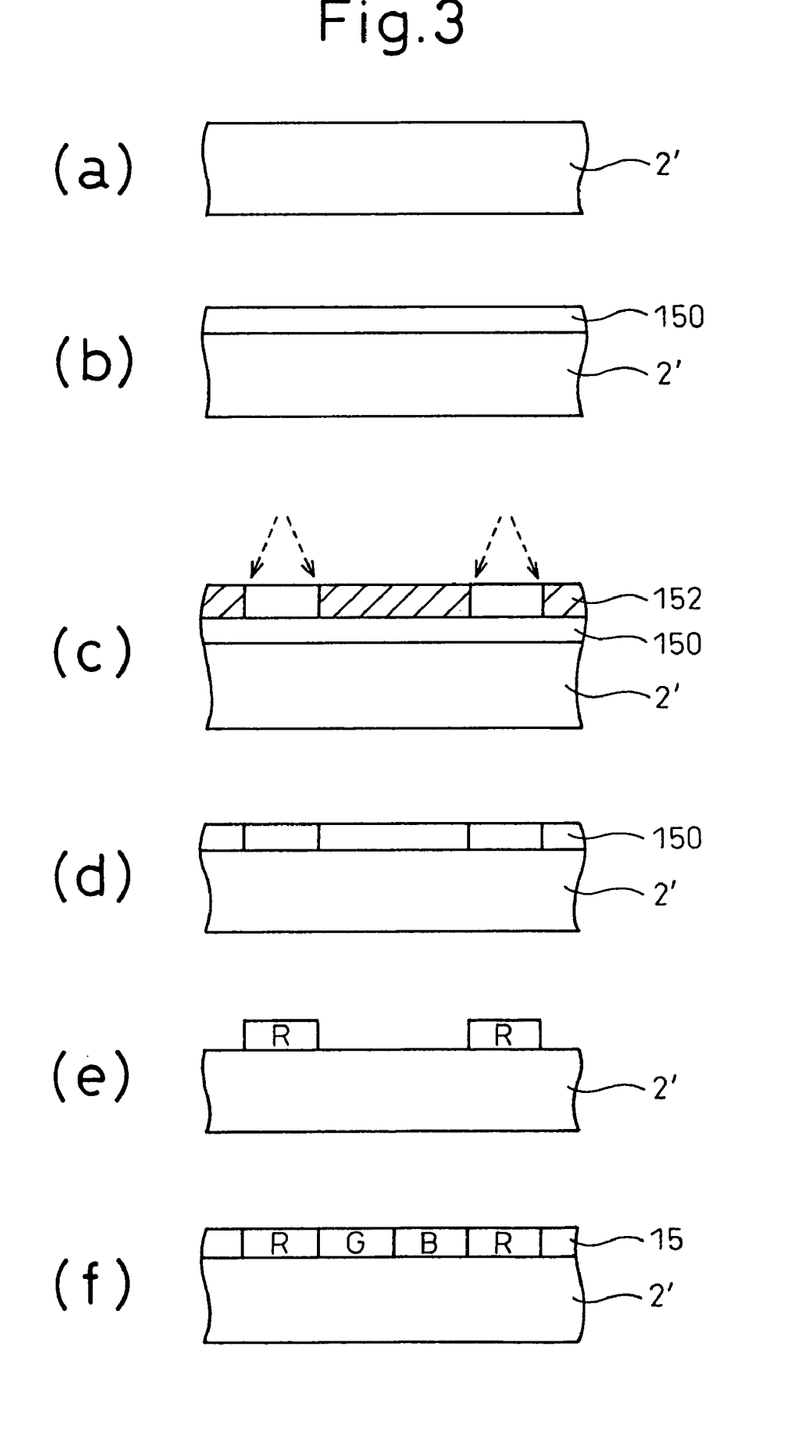
FIGS. 3(a)–3(f) show steps of a manufacturing process of a first color filter.
Figure 4:
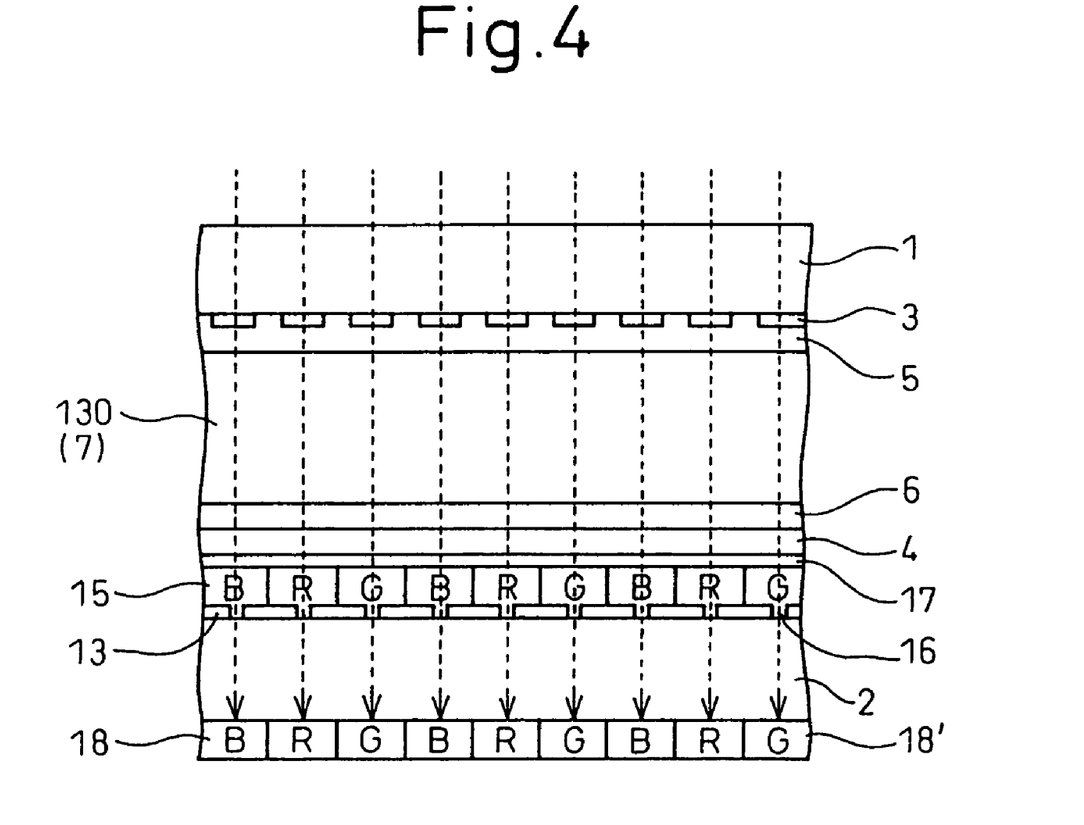
FIG. 4 shows one step of a manufacturing process of the device shown in FIG. 1.

FIG. 4 is a diagram for describing an alternative manufacturing method of the second color filter 18 of FIG. 2. In this manufacturing method, the bottom substrate 2, on which the reflective layer having holes and the first color filter 15 have been formed and the electrodes and the alignment layer have been provided appropriately, is coupled with the top substrate 1, on which the electrodes and the alignment layer are provided, to constitute the liquid crystal panel. After or before the liquid crystal is filled into the liquid crystal panel, the second color filter 18 is formed on the back of the bottom substrate 2. More specifically, the photosensitive emulsion layer 18, is formed on the back of the bottom substrate 2 and, then, light is allowed to impinge on the panel from the side of the top substrate 1 to expose the photosensitive emulsion layer 18' through the first color filter 15 and the openings 16. As a result, the photosensitive emulsion layer 18' is exposed to have a color pattern identical to that of the first color filter 15 and, thus, the second color filter 18 is formed. By providing the retardation films, the polarizers and the backlight device to the second color filter 18 that has been formed as described above, the liquid crystal display device shown in FIG. 1 is completed.

According to the manufacturing method of the liquid crystal display device as shown in FIG. 4, the operation to form the second color filter 18 can be performed after the top substrate 1 and the bottom substrate 2 are coupled together. Therefore, in contrast to the embodiment shown in FIG. 2, the substrate 2 can be handled easily when the second color filter is formed. Further, if the process of application, exposure, developing and the like of the photosensitive emulsion is performed after the liquid crystal is filled into the cell, as it is possible to minimize the possibility that dust or other contaminants are mixed into the liquid crystal cell while the second color filter is manufactured, the degradation of image quality due to the dust can be prevented, the probability of the short circuit between electrodes can be lowered even if the insulating layer is not provided and, therefore, the reliability of the liquid crystal display device can be improved.

Figure 5:
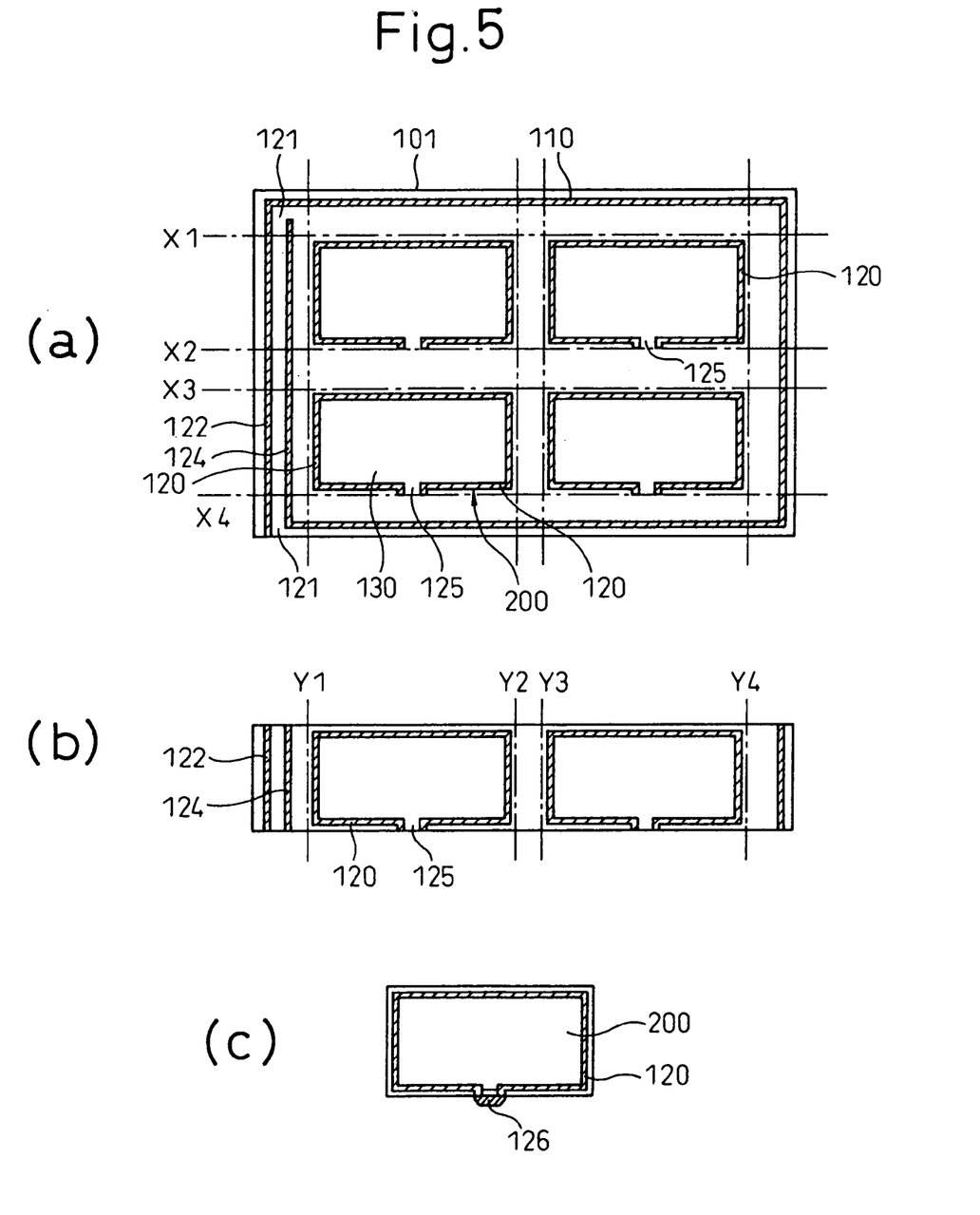
FIGS. 5(a)–5(c) show steps of a manufacturing process for a plurality of liquid crystal display devices simultaneously according to a manufacturing method for liquid crystal display device.

FIGS. 5(a)–5(c) are diagrams showing an alternative manufacturing method of the liquid crystal display device of the present invention shown in FIG. 4. This manufacturing method is characterized in that the second color filter is formed simultaneously for a plurality of liquid crystal cells without contaminating the inside of the liquid crystal cell before filling the liquid crystal. Hereinafter, with reference to FIGS. 5(a)–5(c), this embodiment will be described.

FIG. 5(a) shows a plurality of cells, each of which corresponds to one liquid crystal display device, formed on a large substrate. In FIG. 5(a), two large substrates corresponding to the top substrate 1 and the bottom substrate 2 are coupled together through a first sealing member 110 and second sealing members 120 to form a large-sized cell 101. In this state, the liquid crystal is not filled into each cell 200 enclosed by the second sealing members 120. These sealing members provide a dual seal and, in each of the cells 200, the second sealing member 120 with a filling hole 125 is disposed so as to form a cell space 130. The plurality of cells 200 are encircled by the first sealing member 110, wherein the first sealing member 110 is provided with a circulation path connecting the inside and outside of the substrates so that air is circulated therebetween. In order to form this circulation path, two openings 121 are provided on the outside and inside of the first sealing member 110. The first sealing member 110 must be configured to have a region where portions of the first sealing member 110 itself are disposed in parallel. Here, functions of the openings 121 and the first sealing member 110 the portions of which are disposed in parallel will be described. When the large plate-like top substrate and the bottom substrate are coupled together by thermocompression process, with a spacing provided by the first sealing member 110 and the second sealing members 120, so as to form the large-sized cell 101, if the space between the top and bottom substrates is sealed completely, the air at the central part (inside) of the large-sized cell substrate 101 cannot escape to the outside and, therefore, the substrate 101 will be destroyed by the expansion of the internal air due to the heat from the thermocompression process. The openings 121 are provided to prevent this problem. On the other hand, the sealing sections 122 and 124, that are the portions of the first sealing member 110 disposed in parallel, are provided to prevent liquids, which are used for cleaning or wet developing in the process after the two substrates are coupled, from entering into the cells 200.

FIG. 5(b) shows a strip-like substrate into which said large plate-like cell 101 is cut along lateral cutting lines X (X1, X2, X3, X4). In this strip-like substrate, as a plurality of cells are arranged in a lateral direction and the filling holes 125 of all the cells are opened in one direction, the liquid crystal can be filled into all the cells at one time by using a vacuum filling method. FIG. 5(c) shows one liquid crystal cell 200 into which said strip-like substrate is cut along vertical cutting lines Y (Y1, Y2, Y3, Y4).

Hereinafter, steps of the manufacturing process shown in FIGS. 5(a)–5(c) will be described. In the state shown in FIG. 5(a), in each cell 200, the processes shown in FIGS. 2(a)–2(d) have been completed and, further, the electrodes and the alignment layers have been disposed on the top and bottom substrates and the top and bottom substrates are coupled together through the sealing members. Then, though not shown, a photosensitive emulsion layer is applied on the back of the large-sized substrate 101 and is exposed according to the exposure method shown in FIG. 4. Here, it is to be noted that the liquid crystal is not yet filled into the cell spaces 130. Then, the wet developing process of the large plate-like substrate 101 is performed. At this time, the first sealing member 110, which is made of a sealing material the same as that of the second sealing members 120 and is provided in advance, effectively prevents a developer from entering into the spaces 130 through the filling holes 125 of each cell 200. The first sealing member 110 may have any shape to prevent the developer from entering. In FIG. 5(a), the first sealing member is configured so that it makes 1+¼ turns around the large substrate. It may alternatively be configured so that it makes 1+²⁄₄, 1+¾ or 2 turns.

In the processes described above, the second color filter is formed on all the cells 200 in the large-sized substrate 101 at a time by once forming, exposing and developing the photosensitive emulsion layer. Then, after the developing process, the substrate 101, on which the second color filter 18 (see FIG. 1) is formed, is cut along the lateral cutting lines X1–X4. At this time, the filling holes 125 are opened on the cutting planes of the cutting lines X2, X3 and X4. The strip-like substrate shown in FIG. 5(b) can be obtained by this cutting operation. In this state, a plurality of filling holes 125 of a plurality of cells are made to contact with the liquid crystal material and the liquid crystal is filled into the spaces 130 by controlling the air pressure in the spaces. After the liquid crystal is filled, the filling holes are sealed by sealing members made of a resin material. Then, the strip-like cells are cut along the cutting lines Y1–Y4 shown in FIG. 5(b) into the liquid crystal cell 200 shown in FIG. 5(c). The retardation films, the polarizers and the backlight device are attached to the cell 200 appropriately to obtain the transflective liquid crystal display device.

Figure 6:
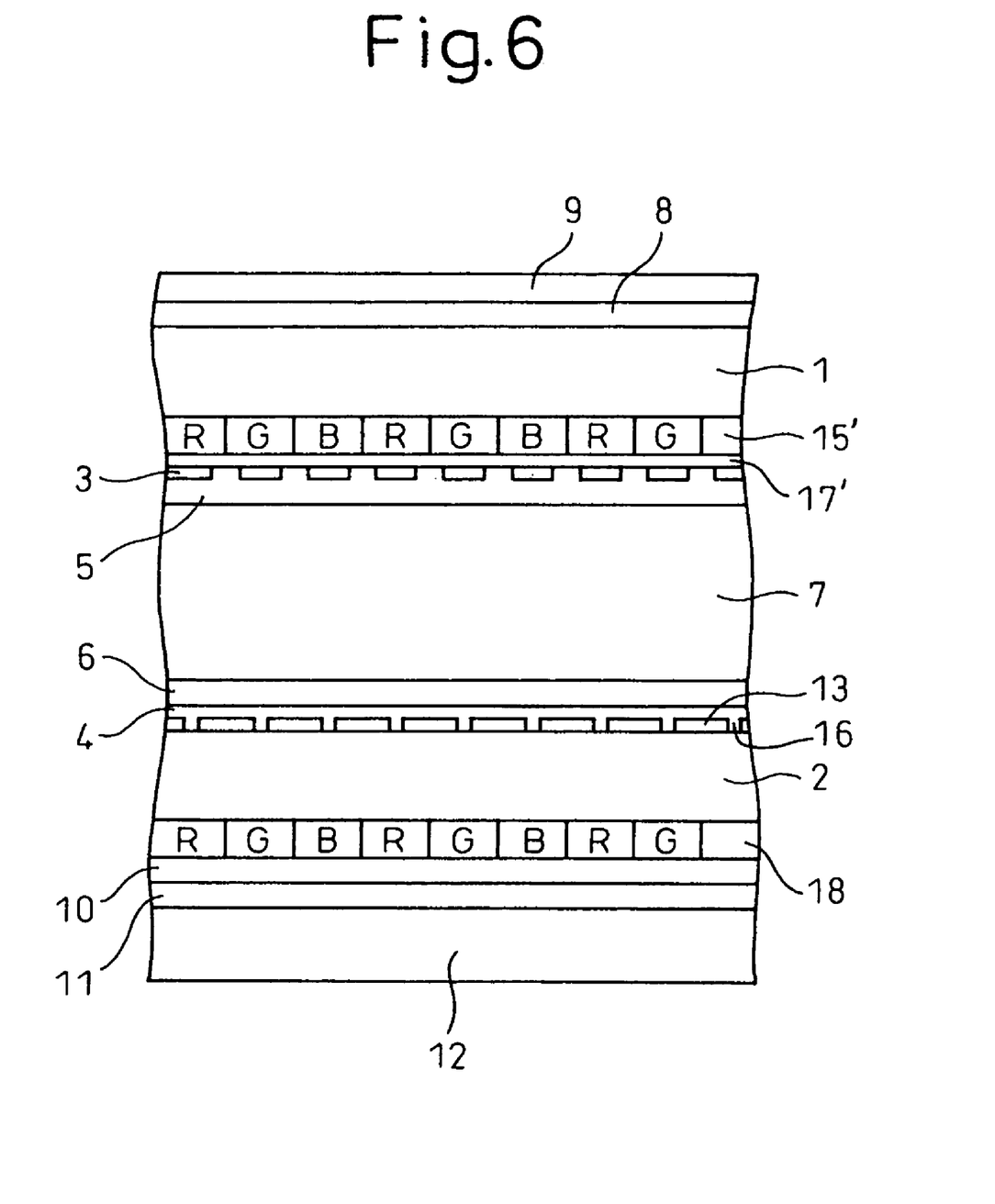
FIG. 6 schematically shows a cross section of a liquid crystal display device according to another embodiment of the present invention.

FIG. 6 shows a construction of a liquid crystal display device according to another embodiment of the present invention. In contrast to the device shown in FIG. 1, this device is characterized in that the first color filter 15' is disposed on the top substrate 1 toward the liquid crystal. Here, the surface of the color filter 15, is planarized by the planarizing layer 17'. In this device, the reflective layer 13 is formed on a surface of the bottom substrate 2 toward the liquid crystal, the photosensitive emulsion layer that is to be turned into the second color filter 18 is formed on another surface of the bottom substrate 2 on the side opposite to the liquid crystal and, then, the second color filter 18 is formed by illuminating the photosensitive emulsion layer from above the first color filter 15, using the reflective layer 13 having the openings 16 as the exposure mask.

It is to be noted that the retardation film, the polarizer, the planarizing layer, the backlight device and the like set forth in the above embodiments are not essential elements to constitute the liquid crystal display device according to the present invention and these may be omitted as appropriate depending on the object, design specification and other conditions of the device. The relationship of the signal and common electrodes to the top and bottom substrates may be inverted from the shown example. Further, though a passive matrix liquid crystal display device is illustrated in the above embodiments, the present invention may also be applied to active matrix (TFT, MIM, TDF) devices, of course. In the case of the TFT liquid crystal display device, one retardation film may suffice.

Further, though a cross section of one liquid crystal cell is shown in the above embodiments, a plurality of cells may be formed between a pair of transparent substrates.

As described above in various embodiments, in the device of the present invention, an appropriate color reproducibility of the display can be obtained easily in both transmissive and reflective modes. Therefore, a transflective liquid crystal display device having high display quality can be obtained. Further, when the photosensitive emulsion is exposed to light to form the second color filter, as the patterning exposure is performed by using the reflective layer on which the openings are provided as the light shielding mask, the process for forming the second color filter can be simplified significantly in comparison with the prior art. In particular, as it is not necessary to change the exposure mask or perform etching at the time of the patterning process, the patterning can be performed in a short time and working efficiency can be improved. As a result, a liquid crystal display device having high reliability can be obtained at low cost.

What is claimed is:

1. A method for manufacturing a liquid crystal display device, comprising the steps of:
   forming a reflective layer having a plurality of openings and then a first color filter on a second transparent substrate, sequentially;
   applying a color photosensitive material on a surface of said second transparent substrate on the side opposite to that on which said reflective layer is formed;
   forming a second color filter that has a color dot matrix pattern same as that of said first color filter by illuminating said color photosensitive material from above said first color filter through the openings of said reflective layer;
   disposing a first transparent substrate opposed to the surface of said second transparent substrate on which said first color filter is formed; and
   filling a liquid crystal between said first and second transparent substrates.

2. A method for manufacturing a liquid crystal display device, comprising the steps of:
   forming a reflective layer having a plurality of openings and then a first color filter on a second transparent substrate, sequentially;
   disposing a first transparent substrate through a sealing member opposite to, and above, a surface of said second transparent substrate on which said reflective layer and first color filter are formed;
   applying a color photosensitive material on a surface of said second transparent substrate on the side opposite to that on which said first color filter is formed;
   forming a second color filter by illuminating said color photosensitive material from above said first transparent substrate through said first color filter, said openings provided on said reflective layer and said second transparent substrate and coloring the material; and
   filling a liquid crystal between said first and second transparent substrates.

3. A method for manufacturing a liquid crystal display device, comprising the steps of:
   forming a reflective layer having a plurality of openings and then a first color filter on a second transparent substrate, sequentially;
   disposing a first transparent substrate through a sealing member opposite to and above a surface of said second transparent substrate on which said reflective layer and first color filter are formed;
   filling a liquid crystal between said first and second transparent substrates;
   applying a color photosensitive material to a surface of said second transparent substrate on the side opposite to said liquid crystal; and
   forming a second color filter by illuminating said color photosensitive material from above said first transparent substrate through said liquid crystal, said first color filter, said openings provided on said reflective layer and said second transparent substrate and coloring the material.

4. A method for manufacturing a liquid crystal display device according to claim 1, wherein said first color filter is formed by a photolithography, a printing, an electrodeposition or an inkjet method.

5. A method for manufacturing a liquid crystal display device according to claim 1, wherein said color photosensitive material is a photosensitive emulsion and the step of forming said second color filter comprises the step of developing said photosensitive emulsion that has been exposed.

6. A method for manufacturing a liquid crystal display device according to claim 2, wherein said first color filter is formed by a photolithography, a printing, an electrodeposition or an inkjet method.

7. A method for manufacturing a liquid crystal display device according to claim 2, wherein said color photosensitive material is a photosensitive emulsion and the step of forming said second color filter comprises the step of developing said photosensitive emulsion that has been exposed.

8. A method for manufacturing a liquid crystal display device according to claim 3, wherein said first color filter is formed by either a photolithography, printing, electrodeposition or inkjet method.

9. A method for manufacturing a liquid crystal display device according to claim 3, wherein said color photosensitive material is a photosensitive emulsion and the step of forming said second color filter comprises the step of developing said photosensitive emulsion that has been exposed.

10. A method for manufacturing a liquid crystal display device, comprising the steps of:
   providing a reflective layer having a plurality of openings on a second transparent substrate;
   providing a first color filter on a first transparent substrate;
   disposing said first transparent substrate opposite to said second transparent substrate through a sealing member so that said reflective layer on said second transparent substrate faces to said first transparent substrate;
   applying a color photosensitive material to a surface of said second transparent substrate on the side opposite to said first transparent substrate;
   forming a second color filter by illuminating said color photosensitive material from above said first transparent substrate through said first color filter and said openings provided on said reflective layer and coloring the material; and
   filling a liquid crystal between said first and second transparent substrates.

11. A method for manufacturing a liquid crystal display device, comprising the steps of:
   providing a reflective layer having a plurality of openings on a second transparent substrate;
   providing a first color filter on a first transparent substrate;
   disposing said first transparent substrate opposite to said second transparent substrate through a sealing member so that said reflective layer on said second transparent substrate faces to said first transparent substrate;
   filling a liquid crystal between said first and second transparent substrates;
   applying a color photosensitive material to a surface of said second transparent substrate on the side opposite to said liquid crystal; and
   forming a second color filter by illuminating said color photosensitive material from above said first transparent substrate through said first color filter, said liquid crystal, and said openings provided on said reflective layer and coloring the material.

* * * * *